United States Patent
Reddy et al.

(10) Patent No.: US 6,996,950 B2
(45) Date of Patent: Feb. 14, 2006

(54) METHOD FOR SEALINGLY ATTACHING A PERIPHERAL ATTACHMENT MEMBER ONTO A FILLED-SEALED POUCH

(75) Inventors: Balakrishna Reddy, Ridgefield, CT (US); Bradley H. Buchanan, Ross, CA (US); M. Jeffrey Willey, Brookfield, CT (US); Annette M. Nikolis, Sandy Hook, CT (US); Chee Kok Ong, Glendale, CA (US); Gene F. Clyde, New Milford, CT (US); J. Antonio Gutierrez, Kent, CT (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 10/345,144

(22) Filed: Jan. 16, 2003

(65) Prior Publication Data

US 2004/0139697 A1  Jul. 22, 2004

(51) Int. Cl.
*B65B 51/10*  (2006.01)
(52) U.S. Cl. .......................................... 53/412; 53/478
(58) Field of Classification Search ................ 53/412,
53/422, 471, 478, 129.1, 133.2; 493/186,
493/189, 213
See application file for complete search history.

(56) References Cited

U.S. PATENT DOCUMENTS

| | | | |
|---|---|---|---|
| 2,850,422 A | 9/1958 | Welch, Jr. ................... 154/118 |
| 3,231,444 A | 1/1966 | Shick .......................... 156/282 |
| 3,244,576 A | 4/1966 | Swartz ......................... 156/513 |
| 3,895,381 A | 7/1975 | Schwartz | |
| 4,598,529 A | 7/1986 | Pongrass et al. .............. 53/452 |
| 4,718,215 A | 1/1988 | Carveth et al. ............... 53/410 |
| 5,066,290 A | 11/1991 | Measells et al. ............ 604/408 |
| 5,420,220 A | 5/1995 | Cheruvu et al. ......... 526/348.1 |
| 5,473,857 A * | 12/1995 | Keeler ......................... 53/410 |
| 5,493,845 A * | 2/1996 | Adolf et al. .................. 53/410 |
| 6,090,029 A * | 7/2000 | LaFleur ...................... 493/213 |
| 6,205,746 B1 | 3/2001 | Moss et al. .................... 53/412 |
| 6,378,271 B1 * | 4/2002 | Skinner et al. ............... 53/410 |
| 6,387,209 B1 | 5/2002 | Nettesheim ............. 156/379.6 |
| 2003/0124294 A1* | 7/2003 | Hodson et al. ................ 428/43 |
| 2003/0179957 A1* | 9/2003 | Tankersley ................... 383/10 |

FOREIGN PATENT DOCUMENTS

| | | |
|---|---|---|
| EP | 1 167 211 A1 | 1/2002 |
| WO | WO 96/19387 | 6/1996 |
| WO | WO 98/00286 | 1/1998 |

* cited by examiner

*Primary Examiner*—John Paradiso
(74) *Attorney, Agent, or Firm*—Bell, Boyd & Lloyd LLC

(57) ABSTRACT

The invention relates to a method for sealing a peripheral attachment member onto a sealed pouch that has been previously filled with a product. The invention also relates to a pouch that includes a peripheral attachment member sealingly attached to at least one of its faces. The method includes a step of providing a multi-layer pouch that is configured so as to provide an inner sealant adapted to form a closed enclosure along sealing lines and an outer sealant that forms at least one external face of the pouch wherein the outer sealant has a melting point that is lower than the melting point of the inner sealant.

28 Claims, 5 Drawing Sheets

METHOD FOR SEALINGLY ATTACHING A PERIPHERAL ATTACHMENT MEMBER ONTO A FILLED-SEALED POUCH

FIELD OF THE INVENTION

The present invention relates generally to a method for sealing a peripheral attachment member onto a pouch that has been previously filled with a product. The invention also relates to such a pouch comprising a peripheral attachment member sealingly attached to at least one of its face.

BACKGROUND OF THE INVENTION

Pouches are commonly utilized in the foodservice area and in clinical nutrition to conveniently deliver viscous food such as sauce or non-viscous liquid food such as ready-to-use beverages. Such products may be dispensed at ambient, hot or chilled conditions depending upon the nature and applications of the product. In most cases, it is important to maintain a high degree of hygiene in the dispenser to avoid bacterial contamination and growth hazards when dispensing. It is also important to provide a pouch that can be associated with the dispenser in a quick and convenient manner. Therefore, pouches have been produced with sealingly attached peripheral members. For instance, peripheral members may be fitments, or accessories for holding or aiding members that are sealed to the pouch in order to establish a convenient and rapid fluid connection with a hose or similar that enables to deliver the product out of the pouch. The location of the fitment on the pouch may also be an important factor that ensures convenient loading and emptying of the pouch with as less as residual product as possible within the pouch.

Pouches are usually preformed into bags prior to the time of filling and have these dispensing fitments sealed to a single sheet of the film prior to the film being formed and sealed into a bag. The fitment may be attached by being inserted through a hole that is punched in the web of film and then sealed to the film. The product is then filled through the fitment and sealed with a cap. These methods lack flexibility since the position of the fitment is determined at the time the bag is formed. Furthermore, the closure with a mere cap is not satisfactory on an hygienic standpoint and the operation for placing a new bag in the food dispenser may be messy and inconvenient for the operator.

There are other sorts of form-fill-seal systems (F/F/S) as described in U.S. Pat. No. 3,894,381 to Christine et al. wherein the bag is formed in tubular configuration in an automated wrapping machine, the fitment is attached on a side of the bag in the machine, the product is filled inline along an open end and, finally the pouch is closed by sealing along its filling end.

These systems present several shortcomings. A first disadvantage is that the filling machine needs to integrate a fitment sealing station. Therefore, not every filling machine is suitable for producing a fitmented pouch and the capital expenditures is elevated to equip a factory in suitable F/F/S lines capable of handling such pouches. A second disadvantage comes from the lack of flexibility regarding the sealing position of the fitment on the pouch and/or the type and dimensions of fitment used which cannot be easily modified since the sealing operation is closely related to the filling machine. This lack of flexibility increases the overall cost of the product and manufacturing complexity.

Another drawback of the previous technique is for the food pouches that contain a microbiologically sensitive food substance such as low acid food. Those pouches may require to be heat treated after filling of the food product within the pouches. This retorting process is widely used for food cans but is not common for the flexible containers with dispensing fitments attached. If retorting is carried while the fitment is already sealed to the pouch, it may affect the integrity of the seal and/or diminish its strength. Furthermore, it may logistically interfere with loading and unloading of the retorts as well as the loading pattern and pouch density within the retort.

Therefore, there would be a need for a method that can handle attachment of a fitment to a pouch after the product has been filled in the pouch and the pouch sealed to form a filled-sealed pouch. There would also be a need for a pouch to be retorted before the fitment has been sealed to it.

U.S. Pat. No. 4,718,215 to Carveth et al. relates to an apparatus for attaching fitments to filled flexible containers that includes a coating wheel for coating a surface of the fitments with a hot melt adhesive or slurry and a continuous conveyor for delivering the fitments in juxtaposition to the flexible containers and urging the fitments against the containers. The sealing energy is provided by high frequency induction welding and the slurry comprises finely ground energy absorbing material such as ferrous iron, nickel, cobalt and the like. Conveyor belts are further provided on each side of the container to limit lateral movement of the container during welding. Such an apparatus is relatively complicated and requires handling of viscous adhesive and special welding and conveying equipment. Furthermore, the apparatus lacks flexibility as it would be difficult to change the position of the fitment on the container because of the relatively fixed conveying arrangement.

U.S. Pat. No. 2,850,422 to Welch is an even older method that also uses high frequency to attach a port structure to a fluid container. The method uses a first metallic electrode to the port element and a second substantially larger electrode to an imperforate area of the other wall of the container opposite the volume of liquid. This method may pose electric hazards and is very dependent on the liquid capacitor which may render it difficult or slow to use at an industrial scale regarding certain food products.

U.S. Pat. No. 3,231,444 to Shick relates to a method of heat sealing the plane surface of a thermoplastic fitment to a planar sheet of thermoplastic material wherein the fitment comprises an upstanding rib of cross-sectional area less than the plane surface and wherein the rib is heated to place it in a molten condition and pressed onto the sheet of thermoplastic. This method requires high heating energy and is slow to obtain a bond of sufficient strength with the risk of puncturing the sheet of material.

U.S. Pat. No. 6,205,746 to Moss et al. relates to a post-processing fitment applicator for applying a fitment to a formed, filled and sealed carton that is used in conjunction with a linear form, fill seal packaging machine such as TETRA REX® packaging machines. The applicator uses a hot melt source to coat the fitment sealing surface. This apparatus is more adapted for sealing fitments onto substantially rigid containers.

EP Patent application 1 167 211 A1 relates to an assembly with a pouch and a fitment which is applied to the pouch by ultrasonic sealing wherein the pouch is made with a film material specially treated on the inside surface through the addition of a special lacquer or film layer to avoid a sealing at this position or wherein the fitment consists of any thermoplastic or a special blended polymer like metallocene. Sealing is carried out by vibrating at high frequency a sonotrode supporting the fitment to generate a frictional heat build-up at the seal interface with the pouch.

In other instances, it may be useful to attach two or more pouches together so as to form a sealed pouch assembly so as to increase the delivery capacity of the assembly without producing a larger pouch. Indeed, although F/F/S machines may be configured to form pouches of various sizes, there are typically limits to the sizes available. If a commercial application calls for the delivery of pouches of higher capacity, it may be advantageous to be able to produce pouches that can be sealed together so as to reach the desired capacity.

Furthermore, there are a number of different packaging machine manufacturers in the packaging industry. They manufacture machines and pouches of various sizes and configurations to meet the demands of various groups and applications. It is currently impossible to take advantage of a wide range of machines available in the industry without going through expensive modifications to adapt the sealing methodology and features to the machines. This greatly limits the economic expansion of the food pouch manufacturing base.

Therefore, a need exists for a method for post-attachment of a peripheral member to a filled-sealed pouch that is, in particular, flexible, economic and reliable. These needs are now met by the present invention.

SUMMARY OF THE INVENTION

The present invention provides a method for connecting a peripheral attachment member onto a closed pouch that has been previously filled and sealed. The pouch may have been produced by any conventional form-fill-seal machine known in the art. The pouch may also have been pre-formed. The method comprises a step of providing a multi-layer pouch that is configured so as to provide an inner sealant adapted to form a closed enclosure along sealing lines and an outer sealant that forms at least one external face of the pouch. The outer sealant can cover all the faces of the pouch or, alternatively, only selectively covered portions of it.

The multilayer pouch is configured so that the outer sealant advantageously has a melting point or seal initiation temperature that is lower than the melting point or seal initiation temperature of the inner sealant.

The method comprises a step of providing a peripheral member onto which is defined at least one sealant intended to connect by sealing to the face of the pouch through the outer sealant of lower melting point at a desired sealing location.

The peripheral member is configured so that its sealant has also a melting point that is lower than the melting point of the inner sealant of the multilayer pouch and is selected of a material capable of making a strong seal with the outer sealant of the multi-layer pouch.

The method comprises a step of positioning the peripheral member with its sealant in contact with the external face comprising the outer sealant of the pouch at, at least, one interface area, and applying sufficient sealing energy at the interface area to provide an intimate seal between the peripheral member and the pouch and a step of releasing energy before the melting temperature or seal initiation temperature of the inner sealant of the pouch has been achieved.

Therefore, the method, as defined, enables to attach a peripheral attachment member of any size and type to any suitable location on a filled-sealed pouch without the risk of any part of the pouch to be accidentally sealed together during the sealing operation of the peripheral member. The method provides more flexibility as sealing may be carried out at any location of a face of the pouch and in a manner independent from the prior production cycles, i.e., the product filling and pouch sealing stage.

DETAILED DESCRIPTION OF THE PREFERRED EMBODIMENTS

Figure 1:
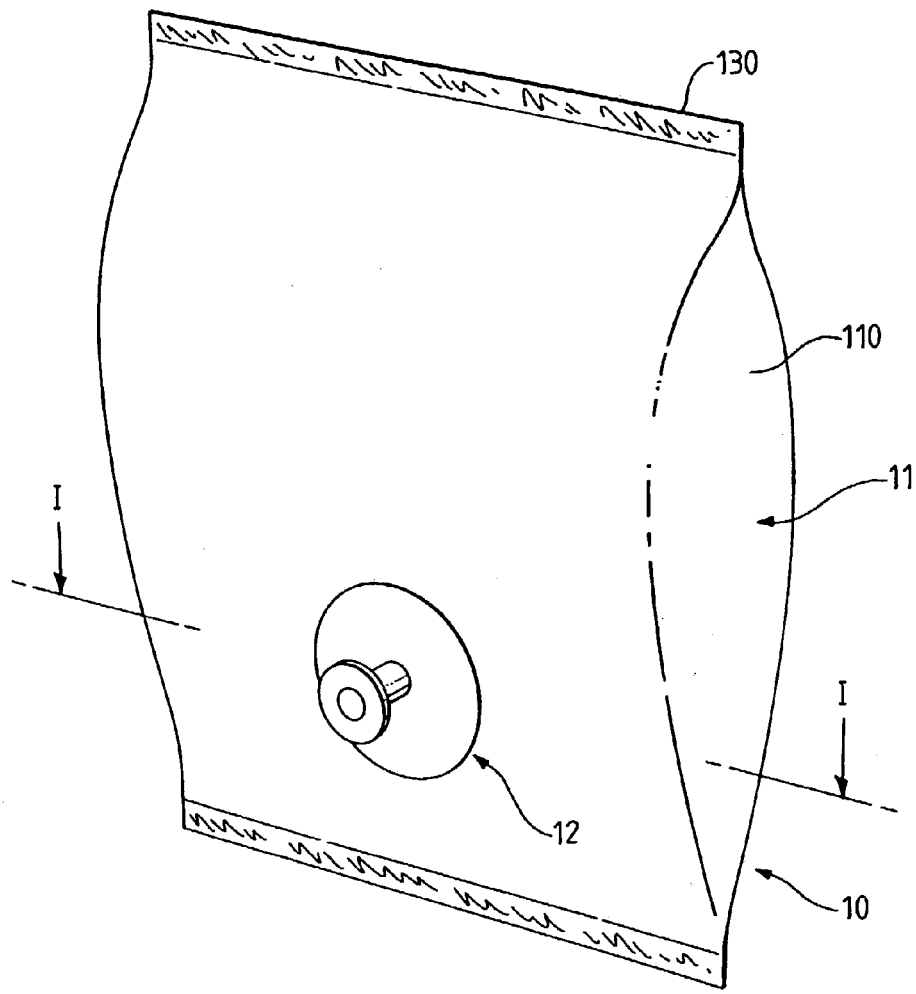
FIG. 1 is a perspective view of a filled-sealed pouch assembly of the present invention comprising a pouch and a fitment sealed to it.

The method preferably comprises flattening the pouch at the interface area against the peripheral member with two parts of the inner sealant of the pouch being pressed together. Furthermore, a sealing die is provided that maintains stationary contact at the interface area and pressure between the peripheral member and the flattened pouch during sealing. This causes a reduction in the thickness of the pouch during sealing the fitment on the pouch with residual product in-between. Flattening of the pouch under pressure against the peripheral member with the product driven out from the seal area provides advantages over methods in which a fitment is welded on filled-sealed bags that substantially retain their shape such as in U.S. Pat. No. 4,718,215.

There are optimal ranges of time, pressure and temperature which result in optimal seals with minimal defects. For instance, the seal strength can be dependent on the pressure factor applied. Typically, the higher the pressure up to a certain limit, the better the heat transfer, therefore the operating temperature of the seal head can be reduced. It further provides other benefits such as stresses in the seals that could have resulted from a minimal difference in geometry or shape at the interface between the pouch and attachment members to be sealed are minimized. Surface irregularity such as crevasses or rugosity of the members and/or films are eliminated or smoothened thereby reducing the risk of possible defective seals.

According to an important aspect of the method of the invention, the sealing energy should be released before the seal initiation temperature of the inner sealant is reached to avoid inner parts of the pouch being welded together. For that, sealing energy is preferably applied at a lower seal temperature range and during a longer period of time as compared to traditional sealing methods. Therefore, the overall sealing energy is transferred at a lower rate than for the traditional methods which is sufficient for initiating sealing at the seal interface area but is insufficient for initiating the sealing at the interior of the pouch.

In one embodiment, sealing energy that is applied is heat conduction energy at the sealing interface. The advantages of heat conduction sealing are, among others, a lower cost and less complexity and a more accurate control of the sealing energy rate transferred, as determined by the parameters of temperature, time and pressure to prevent inner sealant parts of the pouch from sealing together.

Preferably, heat sealing is carried out at a temperature that is lower, preferably at least 2° C. lower, more preferably at least 5° C. lower, even more preferably greater than 10° C. lower, than the melting temperature or seal initiation temperature of the inner sealant of the multilayer pouch and during a period of time of at least 2 seconds, more preferably of from 6 to 12 seconds. Since the system is stationary, pressure is an important factor that influences the sealing initiation of the sealants. Preferably, the pressure at the point of seal is about 20 to 80 psi, and more preferably is 30 to 40 psi.

In the present application, the "seal initiation temperature" ("SIT") refers to the sealing temperature of the material forming the sealant at which a minimum strength is obtained. Seal strength is the strength of the bond at a given sealing temperature. The sealing is the ability of surfaces of films to form a bond or seal that is resistant to pulling apart, peeling, delaminating or otherwise failing under the effect of pressure and heat over a period of time. The resistance of the bond is evaluated through tests which measure the ability to withstand failure as described above. This is generally measured applying a tensile force between the two sealed components and measuring the force to failure, and normalizing per unit area of seal, after the seal has cooled down to ambient temperature.

In one embodiment, the peripheral attachment member is a fitment that is sealed to the multilayer pouch.

In a preferred embodiment, heat energy is carried out by sending heat from the part of the die contacting the rear of the pouch and transferring heat through the inner and outer sealants of the pouch, up to the sealant of the peripheral member. Heat driven through the pouch from its rear side provides the advantage to reduce the energy path toward the seal area as opposed to heating the peripheral member, e.g., a plastic fitment, that may usually have a greater thickness at the sealing interface of it. Owing to the differential in the melting points and seal initiation points between the inner sealant layers in contact one another during the sealing and the outer sealant layers, the sealing of the sealant of the fitment on the external face of the pouch occurs before the inner sealant layer starts even initiating a seal to itself.

In an embodiment, the sealant of the fitment is made of a material that has superior sealing properties, that is compatible in nature with the outer sealant of the pouch and has a seal initiation temperature sufficiently close to the seal initiation temperature of the outer sealant to initiate sealing before the sealing of the inner sealant is initiated. Preferably, the sealant of the fitment and the outer sealant of the multi-layer pouch have melting points that are different from less than 40° C., preferably less than 30° C., most preferably within a differential range between 2 to 10° C. For example, one can choose a material for the sealant of the fitment that is identical to the outer sealant or that has very close sealing characteristics while still being able to form a part of the fitment.

In an embodiment, the fitment and its sealant are made of a single integral part. In another embodiment, the sealing portion comprises a sealant material that is distinct from the material of the body of the fitment but attached to it by any suitable technique such as heat sealing, solvent bonding technique, adhesion with an adhesive, radio frequency, ultrasonic or coextrusion.

More preferably, the sealant of the fitment is selected from the group of polyolefins, polyolefins copolymers and blends with a melting range higher than the melting range of the inner sealant of the pouch. In an even more preferred embodiment, the sealing portion is made of metallocene catalyzed polyethylene (MPE). This material is known for its ability to have a distinct sealing point engineered, compared to polyolefins manufactured in a conventional manner, excellent flowing and mixing properties when melting due to among other things its particular molecular weight distribution. MPE sealants have the ability to flow at a relatively narrow sealing energy window during which it melts and mixes thoroughly with the outer sealant of the pouch.

The pouch is made of a flexible plastic multilayer obtained by lamination or co-extrusion of at least an inner and outer sealant layers with the inner sealant layer to produce seals of the closed enclosure that maintains the product in closed conditions of storage and an outer sealant that ensures the sealing capability with the fitment. The inner and/or outer sealant may additionally provide together or separately the required strength to the structure even though this can also be partly or wholly carried out by additional intermediate functional layers. The outer sealant is preferably present along the whole external surface of the pouch. However, only selected portions of the external surfaces could be covered for local sealing purpose while the rest of the pouch could be made of non-sealable layer.

The outer sealant of the pouch is preferably made of a material selected among the group of polyolefins, polyolefins copolymers and blends. In an even preferred embodiment, the outer sealant is linear low density polyethylene (LLDPE) or metallocene catalyzed polyethylene.

The outer sealant may differ from the sealant of the peripheral attachment member to be sealed thereon, as long as both the melting points stay relatively close to each other and the seal initiation temperatures stay also relatively close to each other.

The inner sealant may preferably be selected from the group of polyolefins, polyolefin copolymers, polyolefin blends. Preferably, the inner sealant is made of medium density polyethylene (MDPE).

Preferably, the melting point of the outer sealant is lower than the melting point of the inner sealant of more than 5° C., preferably within a differential range of from 5 to 30° C., or possibly higher.

The multilayer may also include functional layers, in particular, barrier layers, and/or layers designed for strength and load bearing capabilities, and/or tie layers in various number and types depending upon the needs. Typical strength layers are polyamides or PET layers. Known barriers are ethylene vinyl acetate-(EVOH). One or more tie layer may be suited for being able to structurally establish the inner and outer sealant orientation of the invention.

For example, the multi-layer may comprise at least three assembled parts (oriented from outer to inner): LLDPE/extruded polyamide-EVOH/MDPE having the following ranges of thickness: 5–200; 5–200; 5–200 micrometers, preferably, 10–200; 5–100; 10–200.

In an embodiment, the peripheral attachment member is a second pouch. The second pouch may be a closed pouch having the same multi-layer structure that the first pouch, i.e., a pouch comprising an inner sealant sealed along sealing lines to form a closed enclosure with the product contained therein, and an outer sealant forming at least one external face of the pouch, wherein the outer sealant has a melting point that is lower than the melting point of the inner sealant.

In another embodiment, the sealing of the peripheral member to the pouch is carried out by photonic energy. For that, at least one of the outer sealant of the pouch or the sealant of the peripheral member is a light absorbent layer that provides heat at specific wavelengths of a light source and wherein sealing energy is provided by a light source acting on the at least one light absorbent layer at the specific wavelengths to produce sealing heat.

The present invention also relates to a pouch fitment adapted for being sealed to a pouch according to the aforementioned method, wherein it comprises a main body which has a base end capable of being attached to the pouch, wherein the base end has its surface coated with a film of sealable polymer and wherein the body is made of a material that is sealed to the film of polymer and wherein the material of the base end has a melting point that is equal to or higher than the melting point of the film of the sealable polymer. Preferably, the film is of polyolefin, and even more preferably, it is metallocene catalyzed polyethylene.

Preferably, the body of the fitment is made of relatively stiff polymer material that can be formed by injection molding. In an even preferred embodiment, the body of the fitment is made of a polyolefin. Even more preferably it is LDPE. LDPE gives a preferred combination of appropriate mechanical properties (which include stiffness) as well as being able to seal to the film of polymer, in particular, when the polymer is a polyolefin of relatively lower melting point.

The present invention also relates to a pouch comprising:
a multilayer pouch member having an inner sealant sealed along sealing lines to form a closed enclosure with the product contained therein, and an outer sealant layer forming at least one external face of the pouch, wherein the outer sealant has a melting point that is lower than the melting point of the inner sealant;
at least one fitment preferably comprising a bore and a base end, wherein the base end is securely sealed at a sealing interface area onto the outer sealant of the pouch wherein the bore demarcates inwardly a puncturable film area of the pouch.

The pouch of the present invention with at least one fitment sealed on the face provides a non-violated environment within the closed enclosure that is opened only at the time fluid connection must be established. The fluid transfer out of the pouch can be carried out by piercing the pouch using a piercing spout and the like. A preferred example of a fitment and spout adapted for realizing an hygienic transfer of flowable material from the pouch by piercing is given in U.S. Pat. No. 6,378,730 which entire content is included herein by reference and therefore, does not need to be fully described in the present application.

In an embodiment, at least one layer of metallocene catalyzed polyethylene is present at the sealing interface area of the pouch and fitment.

In another embodiment, the sealing pattern as resulting from the sealing in the sealing device provides a configuration comprising at least two circumferentially distributed sealing rings. In a preferred configuration of the sealing pattern, the innermost ring is situated between the base end and the pouch at the immediate vicinity of the puncturable film area. In another configuration, the two or more discrete rings are located in the same area. In another configuration of the sealing pattern, a continuous seal that extends from the bore to the outside of the fitment is formed.

This sealing multi-ring pattern improves the seal strength during piercing of the film area of the pouch due to the presence of a discrete ring seal at the immediate vicinity of the film area. It also confers a safety zone for eventual fluid leakage that would occur if the discrete ring seal would break during establishing fluid connection and/or during fluid transfer through the fitment.

In an embodiment, the method comprises:
providing a pouch comprising an inner sealant sealed to form a closed enclosure with the product contained therein, and an outer sealant forming at least one external face of the pouch, wherein the outer sealant has a seal initiation temperature that is lower than the seal initiation temperature of the inner sealant;
providing a peripheral attachment member comprising at least one sealant that has a seal initiation temperature that is lower than the seal initiation temperature of the inner sealant of the pouch,
pressing the peripheral attachment member with its sealant in contact with the outer sealant at, at least, one sealing interface; while flattening the pouch at the interface area against the peripheral attachment member with two parts of the inner sealant of the pouch pressed to each other,
applying sealing energy at the sealing interface to provide an intimate seal between the peripheral attachment member and the outer sealant of the pouch and,
releasing energy before the seal initiation temperature of the inner sealant has been attained.

The method of the invention allows products such as food products that need retort processing to be packaged in a pouch for dispensing. At the present time, food pouch requires aseptic packing conditions that are onerous and complex to industrialize and control. It would be a great benefit to remove the need of the aseptic packing while still providing the advantages of a fitmented pouch convenient for dispensing and safe on a microbiological standpoint.

For that the method of the invention also comprises:
providing a pouch that has been previously filled with a sensitive food product and sealed to form a sealed enclosure retaining the product therein,
retort processing the filled-sealed pouch,
subsequently sealing a fitment on at least one face of the pouch.

The sealing method may preferably be carried out according to the aforementioned manner.

Figure 2:
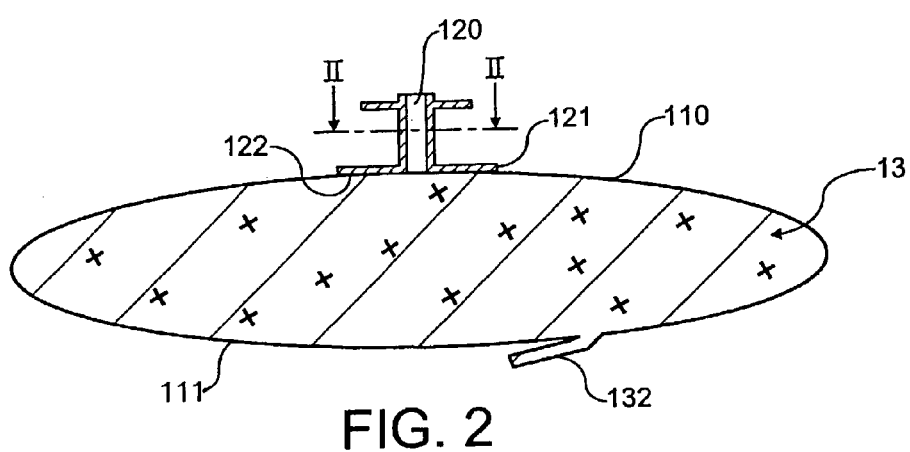
FIG. 2 is a cross-sectional view along I—I of the pouch of FIG. 1.

Referring now to the drawings, FIGS. 1 and 2 show a pouch assembly, such as a food containing pouch assembly, generally designated by the reference numeral 10. The assembly 10 includes a multi-layer pouch 11 having a fitment 12 sealed onto a first face or side 110 of the pouch 11. The pouch may include a pair of faces 110, 111, which are joined at transversal edges 130, 131 and medial longitudinal edge 132 to define a closed fluid-tight enclosure 13 with product contained therein. This sealing configuration of pouch is not limiting. Other sealing configurations could be to have the pouch including a pair of faces which are joined at their four perimeter edges (not shown).

According to one aspect of the invention, the pouch 11 of the invention has been previously filled and sealed using a typical form, fill and seal packaging apparatus (Hereafter called "F/F/S") or under another embodiment using pre-formed pouches.

In the F/F/S technology, the apparatus usually includes: a system for dispensing a web of film, a former for folding the web of film, a sealing device for creating the bottom and top seals, a sealing device for creating the longitudinal seal and an apparatus for dispensing the product that is to be housed in the pouch created. Examples of such an apparatus are disclosed in U.S. Pat. No. 3,894,381 wherein there is furthermore a system for continuously attaching fitments to the tubular web before the pouches are filled and sealed. These F/F/S apparatuses that integrate in-line fitment sealing are expensive from a capital standpoint and lacks of flexibility if important changes need regarding the sealing conditions, e.g., change fitment sealing area, change fitment type or size, etc. The present invention provides a method for attaching fitments to filled-sealed pouches that can be carried out independently from the traditional F/F/S machinery. The invention provides more flexibility that opens great opportunities for customization of pouches with fitments of various sizes, shapes at various locations depending upon the needs. The method can be implemented on-line in combination with F/F/S technology or off-line in a place remote from the F/F/S facility. The invention further minimizes down time and capital expenditures.

In an alternative, the pouch may be preformed with one end open, filled through that end and subsequently sealed.

The method of the invention comprises providing a multi-layer pouch. As shown in FIG. 4a, the multi-layer is configured so as to provide at least two layers including an outer sealant layer 20 (hereafter called "outer sealant") and an inner sealant layer 21 (hereafter called "inner sealant"). The inner sealant 21 is chosen for its sealing characteristics that enable to realize the seals 130–132 of the FFS pouch at the F/F/S stage. The outer sealant 20 is chosen for its sealing characteristics that enable the seals of the fitment 12 thereon. The outer sealant may cover the whole external surfaces of the pouch, i.e., the two faces 110, 111, or alternatively only one face, e.g., only face 110, or alternatively, only discrete portions of the surfaces where sealing of the fitment is required. For practical film manufacturing reasons, the pouch is preferably made of a multi-layer plastic film that has the inner and outer sealants laminated or extruded as a single sheet of film.

According to an important aspect of the invention, the outer sealant 20 is more particularly selected from material (s) that have a melting point (T1) that is lower than the melting point (T2) of the inner sealant 21. The outer sealant 20 has a DSC measured melting point (T1) of about 60–180° C., more preferably 80–140° C. and most preferably 90–125° C. The inner sealant has a melting point (T2) of about 80–220° C., more preferably 90–160° C., and most preferably 100–130° C. The melting point (T2) of the inner sealant is preferably higher than the melting point (T1) of the outer sealant where the difference between T2 and T1 is within a range of 1° C. to 80° C., preferably higher than 10° C., most preferably higher than 20° C. This temperature differential is important to properly control the sealing conditions and avoid the inner part of the pouch to accidentally seal to itself at the time the fitment is sealed to the outer sealant on the external face of the pouch. The inner and outer sealant may also be defined in relation to their seal initiation temperature (Hereafter called "SIT"). The SIT of a sealant is the temperature at which a minimum seal strength is obtained that can no longer be peeled apart without damaging and/or tearing the seal and/or sealants. For a given material, its SIT is reached beyond the melting point at a value that exceeds the melting point of several degrees or tens of degrees. When sealing, it is necessary to exceed the melting point of the material at or even preferably beyond the SIT and maintain a level of seal temperature sufficiently long so that the sealant molecules can flow and mix together in an intimate manner. Therefore, the outer sealant 20 has a seal initiation temperature (SIT1) of about 50–200° C., preferably 110–160° C., most preferably 125–140° C. The inner sealant 21 has a seal initiation temperature (SIT2) of about 60–230° C., preferably 120–200° C., most preferably 130–180° C.

There is usually a close correlation between the melting point and SIT for most of the polymeric sealants, which means that, if one first sealant has a melting point higher than a second material, it also has usually a SIT that exceeds the SIT of the second material. Anyway, the present invention also encompasses the possibility wherein the outer sealant has a melting point (T1) that is higher than or equal to the melting point (T2) of the inner sealant but a seal initiation temperature (SIT1) that is lower than the seal initiation temperature (SIT2) of the inner sealant. In this particular case, the inner sealant will melt sooner than the outer sealant but will not be able to form a seal by the time the outer sealant has actually sealed.

Figure 3:
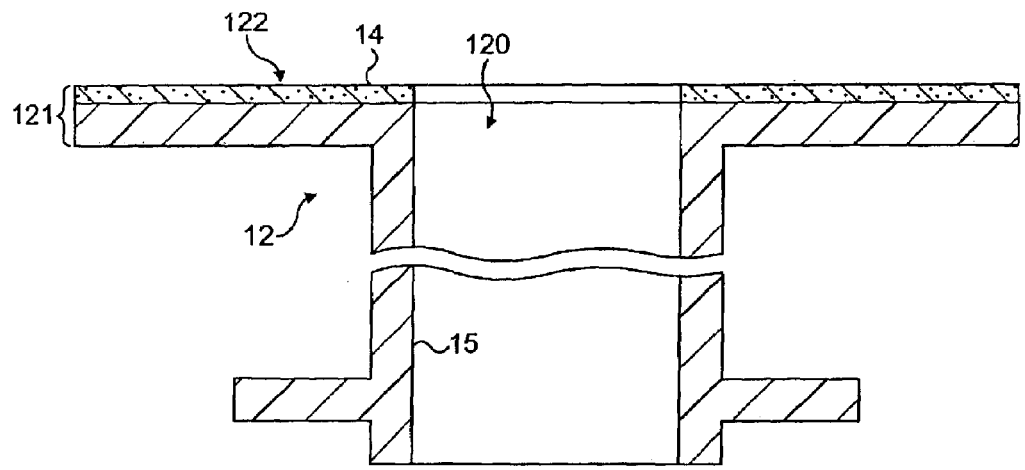
FIG. 3 is a cross-sectional view along II—II of the fitment of FIG. 2 before being sealed to the pouch.

FIG. 3 shows a fitment 12 that may encompass various sizes and shapes depending upon the type of product to be dispensed, the type of dispensing system it usually attaches to, specific standards and food regulations, etc. The fitment 12 may comprise a portion having a bore 120 which is terminated at a first end by a base end 121 comprising an enlarged flange. The flange has usually a substantially flat annular surface 122 adapted to be secured to the outer face 110 of the pouch by sealing onto the outer sealant 20 of the pouch as will be described in greater detail below. The fitment possesses an additional sealant layer 14 (hereafter called "sealant") that may be attached to the main body 15 of the fitment. The body of the fitment may be made of rigid or semi-rigid plastic while the sealant may be a thin film that is attached by any suitable technology depending on the nature and type of materials of the body. For instance, the sealant 14 may be attached to the body by heat sealing, radio-frequency sealing, chemical adhesion, solvent bonding technique and hot melt adhesion. The sealant 14 is chosen in material that has a melting point (T3) that is lower than the melting point (T2) of the inner sealant of the multi-layer pouch. The sealant 14 has preferably sealing characteristics that are as close as possible to the outer sealant 20 with a melting point (T3) close to or equal to the melting point (T1) of the outer sealant. Obviously, the sealant 14 has a SIT that must also be lower than the SIT of the inner sealant 21 of the pouch when sealing is operated in combination with the outer sealant 20 selected for its sealing compatibility with sealant 14. Preferably the sealant has a melting point (T3) that is comprised between 60–150° C., more preferably 80–135° C., most preferably 85–110° C. and has seal initiation temperature (SIT3) between 80–160° C., preferably 85–150° C., most preferably 90–125° C.

The sealant 14 may be a mono layer or multi-layer film having a thickness of from 0.001 to 1.5 mm that is attached to the body of the fitment. In an embodiment, the sealant can also be an integral part of the fitment itself that is produced by plastic molding such as injection molding for a single material or co-injection molding for different materials.

The sealant 14 should be preferably composed of polyolefins, polyolefins copolymers and blends having narrow molecular weight distributions ("MWD") that reduce the melting point and improve melting flow properties. In a preferred embodiment, the sealant 14 comprises metallocene catalyzed alpha-olefin polymer or copolymer. Even more preferably, the sealant is a metallocene catalyzed polyethylene ("mLLDPE"). Such metallocene catalyzed polyethylene includes homopolymers and copolymers that are produced according to known polymerization techniques. Typically, ethylene and optional comonomers are contacted with a catalyst composition at least one metallocene compound and at least one activator under polymerization conditions.

Recently developed metallocene catalyzed, linear low density polyethylene having low melting temperature and low heat seal temperature and a more uniform composition (compared to LLDPE polymerized using conventional and modified Ziegler-Natta catalysts) has been designed for packaging applications. Melting points of mLLDPE usually ranges from 45° C. to 130° C. For example, a metallocene LLDPE film which exhibits a density of at least about 0.900–0.922 g/cm$^3$, low heat seal temperature, low extractable, and a haze value of less than 20%, is disclosed in U.S. Pat. No. 5,420,220. The MWD of polymers is commonly characterized by the polydispersity index (PI), i.e. the ratio between the weight average molecular weight and the number average molecular weight (Mw/Mn), each of which is calculated from molecular weight distribution measured by gel permeation chromatography (GPC). The PI values for metallocene catalyzed PE are very small, i.e. the MWDs are very narrow. The PI values of metallocene PE are usually lower than 3.5, and there are available industrial grades of substantially LLDPE typically having PI in a narrow range 2.0–2.5. Metallocene catalyzed polyethylene will provide an adhesion quality that is comparable to or better than that of a Ziegler-Natta catalyzed polyethylene. However, the real advantage is that due to its MWD and more uniform composition (i.e., comonomer incorporation), the metallocene catalyzed polyethylene has a more narrow melting band with a seal initiation point that is much closer to the melting point.

The mLLDPE film may be heat sealed on a body of fitment made of any suitable plastic such as polypropylene, polyethylene or polyamide or others.

The sealant materials for the multi-layer pouch are chosen, as aforementioned, depending upon their sealability, melting points and SIT range and tensile properties, tear strength, puncture resistance, eventually clarity, etc. The inner sealant 21 can be a sealable material of relatively high melting point and SIT but still capable of creating a good seal during the previous FFS stage. The inner sealant is preferably selected among the group of polyolefins, polyolefins copolymers and blends. Preferably, the inner sealant is a medium density polyethylene (MDPE) or high density polyethylene (HDPE).

The outer sealant 20 is preferably selected among the group of polyolefins, polyolefins copolymers and blends. Preferably, the inner sealant is a linear low density polyethylene ("LLDPE"), ultra low density polyethylene ("ULDPE") or metallocene catalyzed polyethylene (MPE). The outer sealant could also be made of other materials having low melting points such as PVC.

The multi-layer film may include intermediate additional functional layers such as barriers, puncture resistant/strength layers or tie layers. Barrier layers are used for their ability to serve as a barrier to one or more gases. Oxygen barrier layers can comprise, for example, ethylene/vinyl alcohol copolymer, polyvinyl chloride, polyvinylidene chloride, polyamide, polyester, polyacronytrile, etc., as known to those skilled in the art; preferably the oxygen barrier layer comprises ethylene/vinyl alcohol copolymer. Tie layers refer to any layer having the primary purpose of adhering two layers to one another, and more specifically, in the present context having the purpose of adhering sealant layers to sealant layers or sealant layers to functional layers such as barrier layers or puncture resistant layers. Tie layers may encompass polyolefins, modified polyolefins such as anhydride modified grafted low density polyethylene, EVA copolymer, modified EVA copolymers such as anhydride modified grafted low density ethylene/vinyl acetate or others.

Examples of film laminates may be (oriented from outer to inner): LLDPE/PET or Nylon/HDPE film, LLDPE/PET or Nylon/MDPE film, mLDPE/PET or Nylon/HDPE film, mLDPE/PET or Nylon/MDPE film, ULDPE/PET or Nylon/HDPE film; ULDPE/PET or Nylon/MDPE film; LLDPE/PET or Nylon/EVOH/HDPE film, LLDPE/PET or Nylon/EVOH/MDPE film, mLDPE/PET or Nylon/EVOH/HDPE film, mLDPE/PET or Nylon/EVOH/MDPE, ULDPE/PET or Nylon/EVOH/MDPE and ULDPE/PET or Nylon/EVOH/HDPE. Intermediate PET or Nylon layers are strength layers. The laminates may be obtained by co-extrusion or lamination. The EVOH can be part of a 2, 3, or more layer coextrusion with either the Nylon or PET layers, or it could be on either side.

For example, the laminate for the pouch may be composed of film having an overall thickness of about 0.025 to 0.25 millimeters.

Figure 4:
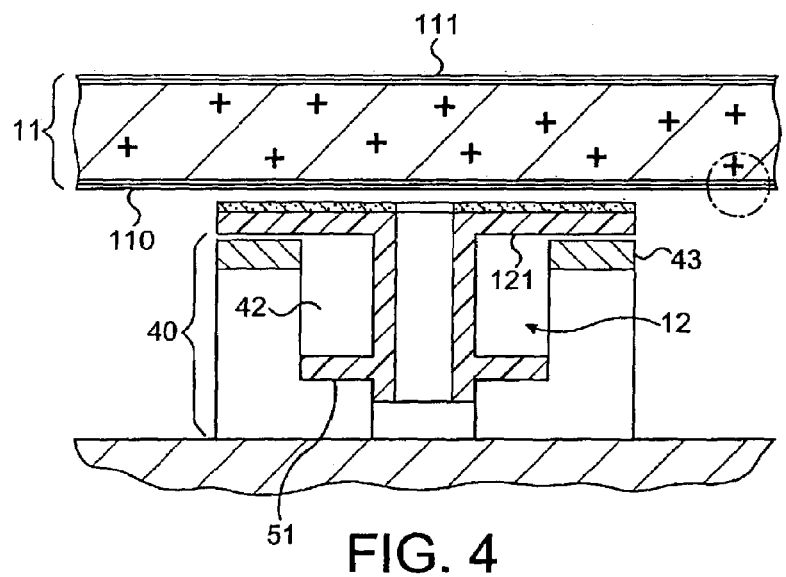
FIG. 4 is a cross-sectional view showing the fitment and pouch before sealing where the dies are open.
Figure 4A:
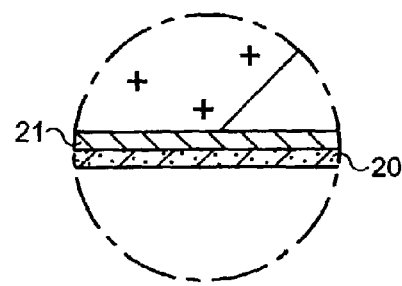
FIG. 4a is a partial enlarged view showing an exemplary of film construction of the pouch.
Figure 5:
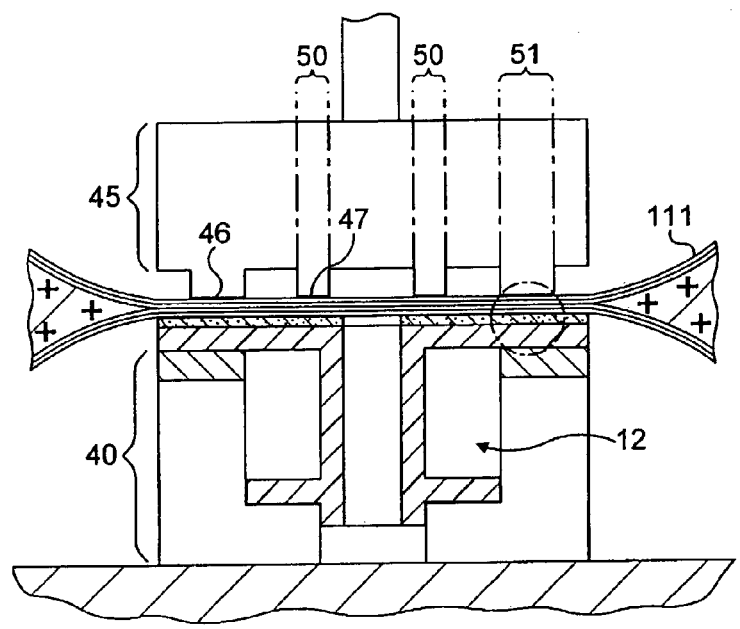
FIG. 5 is a cross sectional view showing the fitment and pouch during sealing where the dies are closed.

FIGS. 4 and 5 show a sealing die embodiment that is used for the sealing process. To seal the fitment 12 to one face 110 of the pouch, the fitment 12 is inserted in an inverted position in a die support 40 comprising a hollow central part 42 and a bottom support surface 41 for firmly supporting the fitment in place. The fitment is inserted so as to orient its sealant surface upward. A distance "d" is preferably left between the base end 121 of the fitment and a peripheral upper support surface 42 of the die support 40. The gap "d" causes the base end 121 of the fitment to endure the pressure of the upper die and therefore ensures a proper contact and pressure control between the fitment and the pouch at the periphery of the fitment's collar 121. The surface 42 is preferably covered by a resilient material having a certain durometer to further absorb the deformation due to the pressure exerted by the upper die member upon sealing.

Figure 5A:
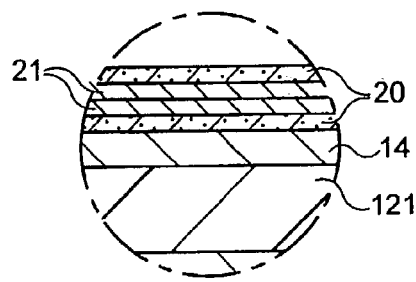
FIG. 5a is a partial enlarged view showing the sealing interface area, and particularly the layer arrangement, when the pouch and fitment pressed together and the dies closed.

To seal, the filled-sealed pouch 11 is positioned substantially flat on the surface of the base end 121 in contact with sealant 14. An upper sealing die member 45, such as a reciprocating member activated by an hydraulic piston, is then applied onto the rear face 111 of the pouch to apply pressure at the interface areas 50, 51. The upper sealing die member 45 can comprises two or more circumferentially oriented protrusions 46, 47 that direct pressure and sealing energy onto the interface areas 50, 51. The compression of the die member 45 onto the pouch assembly against the die support 40 causes the overall sealing arrangement of the pouch to flatten and the product contained therein to flow out of the flattened area and redistribute in the remaining volume of the pouch. FIGS. 5 and 5a show the overall sealing area collapsing to essentially a flattened position where the inner sealant 21 of the pouch contacts itself The sealing die member 45 also applies sealing energies, preferably heat conduction energy, beyond the melting points of the outer sealant 20 and fitment's sealant 14 to initiate intimate sealing of the two sealants together but while maintaining the sealing temperature at all time below the seal initiation temperature of the inner sealant 21.

As the thickness of the pouch is usually lower than the thickness of the base end of the fitment, heat energy is preferably transferred from the rear of the pouch to the interface areas. This allows to better control the heat rate that goes through the laminate up to the seal interface areas. It reduces the risk of sending too much heat to overcome the thickness of the fitment and so inadvertently melting the inner sealant to itself during the sealing process. However, since sealing energy directly passes through the inner sealant, it is also particularly important to respect the particular film construction with a melting temperature differential of the inner and outer sealant to prevent the inner sealant from being seal before the outer sealant.

In fact, it has been noticed that heat sealing is better controlled by applying heat at a lower magnitude and during a longer period of time. Heat sealing is carried out at a temperature that is lower, preferably at least 2° C. lower, more preferably at least 5° C. lower, and most preferably at least 10° C. lower, than the seal initiation temperature of the inner sealant 21 and during a period of time of at least 5 seconds, preferably at least 6 seconds, most preferably of from 8 to 15 seconds. Preferably, a pressure of from 25 to 80 psi, more preferably 30 to 40 psi is preferred.

Figure 6:
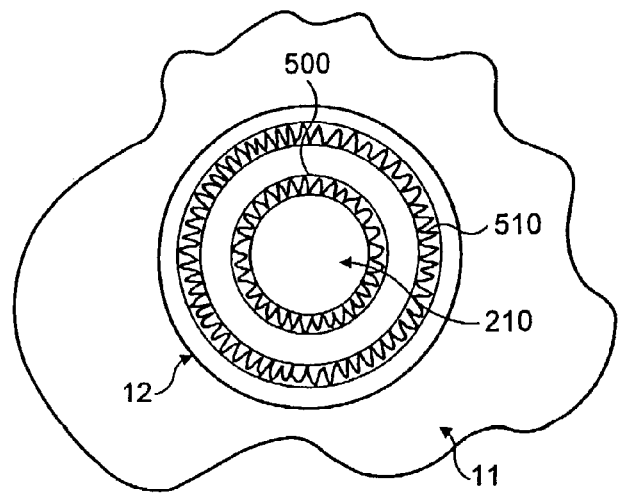
FIG. 6 is a partial plan view of the fitment ends sealed to the face of the pouch.
Figure 7:
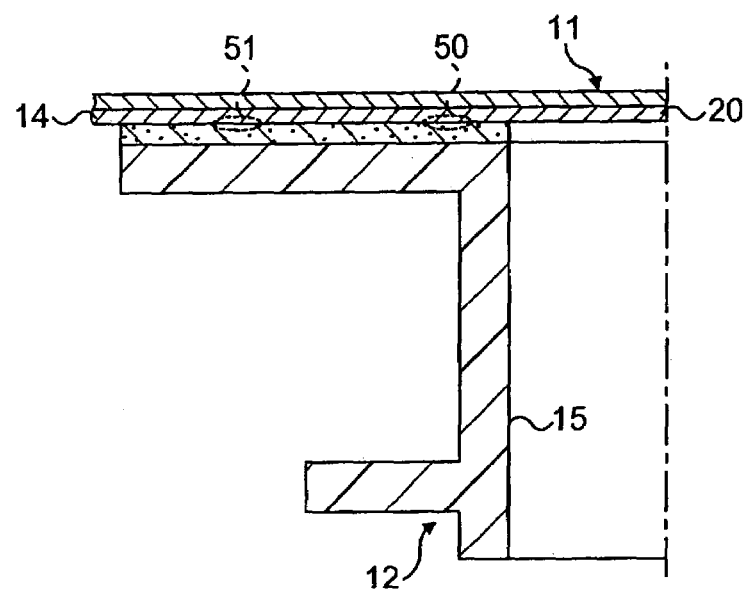
FIG. 7 is a partial cross-sectional view of the fitment and pouch sealed together.

FIGS. 6 and 7 show the sealing area of the fitment onto the pouch after the sealing process has been completed. As a result of the sealing, the sealed interface area comprises at least two circumferentially distributed sealing rings 500, 510 between the fitment and the pouch that surrounds a puncturable film area 210 of the pouch. The rings have an innermost ring that is situated between the base end and the pouch at the immediate vicinity of the puncturable film area 210. This sealing configuration is particularly suitable for fitments of a transfer device which can be assembled in piercing engagement by means of a piercing spout. The spout member usually comprises a piercing end and a portion of tube having an outer surface capable of mating in coaxial relationship with the portion of bore of the fitment. A device for effecting transfer of material from a container by piercing is described in full detail in U.S. Pat. No. 6,378,730; the content of which is incorporated herein by reference. Since piercing of the film at the area 210 may create tearing forces on the seals that could possibly damage the seals, the innermost seal ring has the function to resist to the tearing forces applied at the seal. As a result, it is of relatively small width, preferably of from 0.5 to 10 mm, most preferably 1 to 3 mm, and positioned as close as possible to the area 200 submitted to the piercing so as to create a higher resistance to tearing during the piercing of the pouch for establishing the fluid connection. A second seal ring 510, of preferably larger width, preferably of from 2 to 20 mm, most preferably 5 to 10 mm and is concentrically positioned further outside from the first ring 500. The second ring ensures the fitment is firmly and securely attached to the pouch. The seal should resist to repeated handling of the pouch assembly by grabbing the fitment once it is fully loaded with the product contained therein and without risking tearing the fitment apart.

Figure 8:
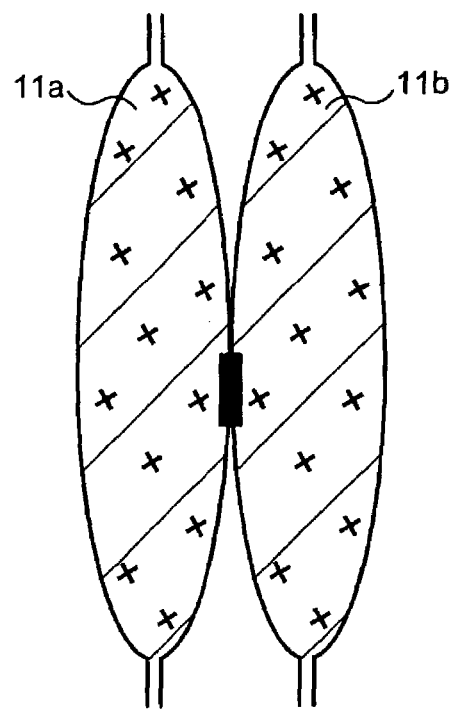
FIG. 8 is an embodiment of two pouches of the invention sealed together.

The present invention is not limited to sealing of fitments to pouches but also encompass attaching various sorts of peripheral attachment members to a pouch, including the peripheral attachment member being a pouch itself. FIG. 8 illustrates an example in which two pouches are attached together by sealing. In this example, the pouches may be of the same type and sealed together using the method as previously described. The pouches may both have an outer sealant of lower melting point and seal initiation temperature as the inner sealant. The pouches 11*a*, 11*b* may be sealed directly one to the other by flattening the two pouches at the sealing interface while applying pressure and seal energy. In a preferred way, a patch of material having a higher sealability may be interposed between the two pouches to promote sealing at milder seal conditions to reduce the risk of sealing the inner sealant to itself. The patch may preferably be a metallocene catalyzed alpha-olefin polymer or copolymer. The two pouches may have a LLDPE for the outer sealant and MDPE for the inner sealant.

It may pointed out that the present invention may also require some changes at the form, fill and seal stage due to the particular configuration of the multi-layer film that comprises an outer sealant of lower melting point as the outer sealant. F/F/S process is very well know to those skilled in the art and therefore does not need to be described in full detail herein. F/F/S apparatus are commercialized to produce F/F/S pouches by Liqui-box company or INPACO. A F/F/S apparatus usually comprises a die or mold that initially shapes or forms a web of film into a tubular formation. Next, the tubular formed film is passed into engagement with a sealing unit that serves to automatically seal the seam along its longitudinal length. The longitudinal sealing unit may have any desired construction or configuration and may consist of a rotary sealing unit that co-acts with an inner member. A transversal sealing and cutting anvil-like member is further provided as well as a heating unit or the like that can be connected to a plunger or piston. The sealing and cutting unit is adapted to provide sealed ends on opposite ends of the completed pouches. Before the ends of the bags are sealed at their upper ends, a conduit or pipe is adapted to be used for introducing product into the interior of the tubular members.

It is important to notice that the sealing methodology of the invention may be applied to pouches that have not been made on a F/F/S machine, rather it could be used on a preformed pouch or a pouch that has been made by any other suitable means.

In order to allow the pouch to be properly formed and sealed along sealing line by adhesion of the inner sealant along sealing lines as previously described, it has been found that the sealing mechanisms, i.e., the longitudinal and transversal sealing units should preferably have sealing surfaces made of a material that has heat resistance and a low surface energy. Surface energy is a measure of the adhesive force between a surface and another substance and is measured by the angle between the surface and the outside surface of the drop measured through the air. Materials suitable for use in constructing the contacting sealing surfaces are more particularly polytetrafluoroethylene (Teflon®). However, other materials of similar characteristics may be silicone rubber and the like. It has been noticed that when used coated PTFE sealing surfaces, the inner sealant would be sealed properly at the seal temperature required while the outer sealant would also melt since having a lower melting point than the inner sealant but without sticking to the sealing surfaces. The thickness of low surface energy material on the sealing dies is not critical provided it is sufficient to resist to wear but not too thick to not insulate too much from the heat transferred to the film.

Figure 9:
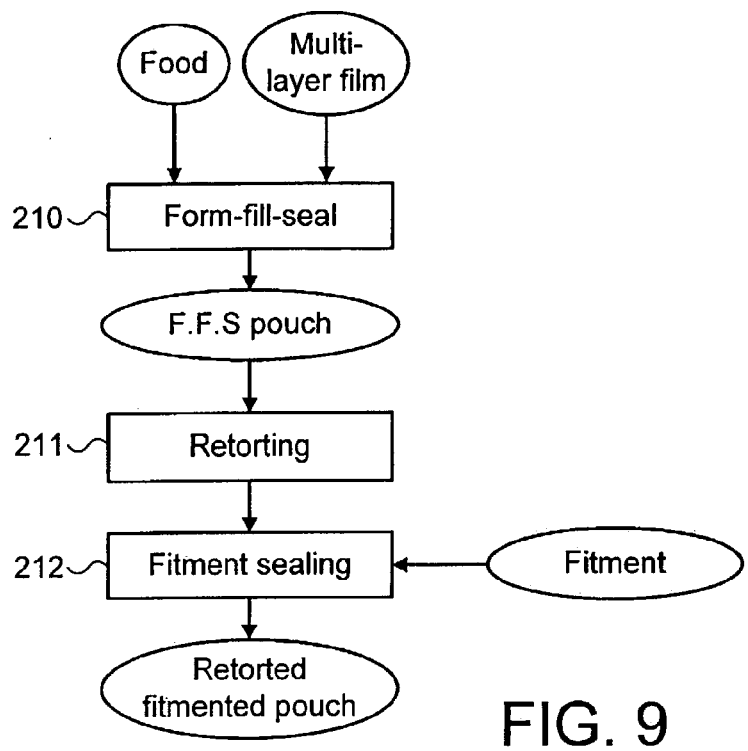
FIG. 9 is a flow chart showing the steps for providing a retorted formed-filled-sealed food pouch with a sealed fitment thereon.

FIG. 9 shows a simplified flow chart for producing a food pouch that has been treated by retort processing while having a fitment securely attached thereon to procure the advantages of easy and convenient dispensing. In a first stage 210, a multi-layer packaging film with inner and outer layers as recommended, is provided and food is processed to be enclosed in a multi-layer pouch by F/F/S technology. There is no requirement for aseptic filling conditions at the F/F/S stage which are restricting, complicated and costly to carry out.

Aseptic filling can advantageously be replaced by a retorting step 211 of the pouch after the pouch has been formed, filled and sealed but before the fitment has been attached to the face of the pouch. Retorting consists in submitting the food pouch to a heat treatment at a temperature sufficient to kill any substantial microbiological life within the pouch and food. Heat treatment conditions may greatly vary from product to product. In general, retorting for microbiological stability of a neutral pH food or beverage requires to heat treat the pouch at a temperature of at least 120° C. during at least 50 minutes. Retorting may be carried out under 2–3 bars in super heated water or steam or steam-air mixture. The precise setting of the critical retorting parameters (temperature, pressure, time) is usually determined by a skilled in the art of thermal engineering technology depending upon the type of product to be retorted, quantity and packaging material. In the final stage 212, a fitment is attached to the retort pouch by the method of the invention.

Figure 10:
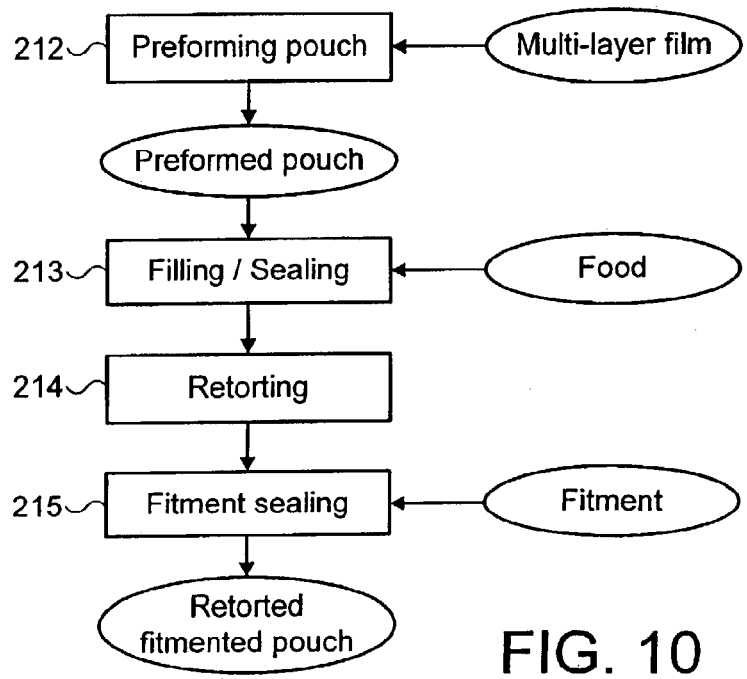
FIG. 10 is a flow chart similar to FIG. 9 but for a preformed pouch.

FIG. 10 shows an alternative embodiment of the production of a retort food pouch in which the pouch is initially obtained by preforming 212. Food is then filled and the pouch sealed closed in a further step 213. Retorting 214 is then carried out at the same general conditions as for the previous example. Finally, the fitment is sealed in a sealing stage 215 to the side of the multi-layer pouch.

In another embodiment, heat conduction sealing may be replaced by photonic energy based sealing. For that, the seal area becomes a light absorbent area. Therefore, at least one of the outer sealant of the pouch or the sealant of the peripheral member is a light absorbent layer that provides heat at specific wavelengths of a light source. A light source is directed to the seal area to act on the at least one light absorbent layer at the specific wavelengths that produces sealing heat.

A light source can be laser source such as YAG laser, diode laser or non coherent sources such as halogen lamps and xenon lamps.

In an embodiment, the at least one sealant layer is a thermoplastic layer doped with a light absorbing material. In another embodiment, the sealant layer itself is the light absorbing material.

In a preferred embodiment, the peripheral member may have a sealant made of metallocene catalyzed polyethylene (MPE) doped with light absorbing material.

Therefore, the light absorbing material may be a pigment, a polymer resin, fibers or powder that absorbs light and produces heat at specific wavelengths. The light absorbing material may, for instance, be carbon or graphite powder that infrared energy at wavelengths of varying values.

The method of the invention using photonic energy offers the advantage of applying the energy very locally to the seal area. Since the film material and un-treated fitment material is typically transparent to the light energy, i.e., that it would not absorb the energy therefore would not have a tendency to melt, the only area that would heat up is at the desired area of sealing. Applying light absorbing material to the seal area allows that area to heat up beyond the seal initiation temperature of the fitment and sealant layers of the film. The fitment also has a pressure applied as described previously, creating a seal. Since the heat does not have to be conducted through the inner layers of sealant of the bag (indeed, light is transmitted freely and absorbed only where wanted), this offers an advantage of a wider sealing window than that heat conduction method.

Therefore, the light absorbing material may be a pigment, a polymer resin, fibers or powder that absorbs light and produces heat at specific wavelengths.

High density polyethylene (HDPE) refers to a polyethylene having a density of about 0.95 g/cm$^3$ or greater.

Low density polyethylene (LDPE) refers to a polyethylene having a density between about 0.91 and 0.925 g/cm$^3$.

Ultra Low density polyethylene (ULDPE) refers to a polyethylene having a density of less than 0.910 g/cm$^3$.

Medium density polyethylene (MDPE) refers to a polyethylene having a density between about 0.926 and 0.949 g/cm$^3$.

As used herein the term "seal" refers to any seal of a first region of surface to a second region of a surface, wherein the seal is formed by heating the regions to at least their respective seal initiation temperature. The heating can be performed by any one or more of a wide variety of manners, such as using heat conduction, radio frequency or photonics.

As used herein the term "pouch" refers to any sort of flexible film based package or container, of any shape and size, adapted to form a sealed tight enclosure.

As used herein the term "product" means a viscous, semi-solid, powdery or liquid product adapted to flow within the pouch and through the fitment including, but not necessarily restricted, to food.

As used herein the term "food" means food, beverage or any other kind of nutrient.

It should be understood that various changes and modifications to the preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

What is claimed is:

1. A method for sealingly connecting a peripheral member onto a closed pouch wherein the pouch has been previously filled with product and sealed to form a sealed enclosure retaining the product therein, the method comprising:

providing a flexible, multilayer pouch comprising an inner sealant sealed to form a closed enclosure with the product contained therein, and an outer sealant forming at least one external face of the pouch, wherein the outer sealant is adjacent to the inner sealant at a location where the peripheral member is to be connected and has a melting point that is lower than that of the inner sealant;

providing the peripheral attachment member comprising at least one sealant that has a melting point or seal initiation temperature that is lower than the melting point or seal initiation temperature of the inner sealant of the pouch and that has sealing characteristics that are compatible with the outer sealant layer of the pouch, positioning the sealant of the peripheral attachment member in contact with the outer sealant at at least one sealing interface area, applying sealing energy at the sealing interface area to provide an intimate seal between the peripheral attachment member and the outer sealant of the pouch, and releasing or removing the sealing energy before the melting point or the seal initiation temperature of the inner sealant is achieved.

2. The method according to claim 1, which further comprises flattening the pouch at the sealing interface area against the peripheral attachment member with two parts of the inner sealant of the pouch pressed to each other before applying the sealing energy.

3. The method according to claim 2, wherein the flattening of the pouch is achieved by providing a sealing die that maintains stationary contact at the sealing interface area and pressure between the peripheral attachment member and the two parts of the flattened pouch during application of the sealing energy.

4. The method according to claim 3, wherein the sealing energy to be applied is thermal energy transferred from the die to the sealing interface area.

5. The method according to claim 4, wherein the intimate seal is a heat seal that is obtained by transferring heat from the part of the die that contacts the rear of the pouch through the inner and outer sealants of the pouch to the sealant of the peripheral attachment member.

6. The method according to claim 4, wherein the heat seal is obtained within a temperature range that is at least 2° C. lower than the melting temperature or seal initiation temperature of the inner sealant of the pouch.

7. The method according to claim 4, wherein the heat seal is obtained within a temperature range that is at least 5° C. lower than the melting temperature or seal initiation temperature of the inner sealant of the pouch.

8. The method according to claim 1, wherein the sealant of the peripheral attachment member is made of a material that is compatible with the outer sealant and has a melting point temperature that is sufficiently close to the melting point of the outer sealant to initiate sealing before sealing with the inner sealant is initiated.

9. The method according to claim 8, wherein the fitment and its sealant are made of a single integral part.

10. The method according to claim 8, wherein the fitment and its sealant are distinct components.

11. The method according to claim 10, wherein the sealant is made of metallocene catalyzed alpha-olefin polymer or copolymer.

12. The method according to claim 1, wherein the peripheral attachment member is a fitment.

13. The method according to claim 12, wherein the sealant is a film that is sealed to the fitment before attaching the fitment to the outer sealant of the pouch.

14. The method according to claim 1, wherein the outer sealant of the pouch is made of a polyolefin, a polyolefin copolymer or a blend thereof.

15. The method according to claim 14, wherein the outer sealant is a linear low density polyethylene, an ultra low density polyethylene, or a metallocene catalyzed alpha-olefin polymer or copolymer.

16. The method according to claim 14, wherein the inner sealant is a polyolefin, polyolefin copolymer, or polyolefin blend.

17. The method according to claim 16, wherein the inner sealant is a linear medium density polyethylene or a high density polyethylene.

18. The method according to claim 1, wherein at least the outer sealant of the pouch or the sealant of the peripheral member is a light absorbent layer that provides heat at specific wavelengths of a light source, and which further comprises providing the sealing energy by a light source that acts on the at least one light absorbent layer at the specific wavelengths.

19. The method according to claim 18, wherein the at least one outer sealant of the pouch or the sealant of the peripheral member is made of a light absorbing material or a thermoplastic layer that is doped with a light absorbing material.

20. The method according to claim 19, wherein the light absorbing material is a pigment, a polymer resin, fiber or powder that absorbs light.

21. The method of claim 1 which further comprises sealing a pouch fitment to the pouch, wherein the fitment comprises a main body having a base end capable of being attached to the pouch, wherein the base end has a surface coated with a polymer film, the body is made of a material that is sealable to the polymer film, and the body is made of a material that has a melting point that is equal to or higher than that of the polymer film.

22. The method according to claim 21, wherein the polymer film of the pouch fitment is a metallocene catalyzed polyolefin.

23. The method according to claim 1, which further comprises filling the pouch with a sensitive food product prior to sealing to form the enclosed pouch and for retaining the product therein; retort processing the filled-sealed pouch; and subsequently sealing the fitment on at least one face of the pouch.

24. The method according to claim 1, wherein the pouch further comprises a plurality of fitments sealed at different locations on the pouch.

25. A method for sealing a peripheral member onto a closed pouch wherein the pouch has been previously filled with product and sealed to form a sealed enclosure retaining the product therein, comprising:
  providing a flexible pouch with an inner sealant sealed that forms a closed enclosure with the product contained therein, and an outer sealant forming at least one external face of the pouch, wherein the outer sealant has a seal initiation temperature that is lower than that of the inner sealant;
  providing a peripheral attachment member with at least one sealant that has a seal initiation temperature that is lower than the seal initiation temperature of the inner sealant of the pouch;
  contacting the peripheral attachment member and its sealant with the outer sealant at at least one sealing interface area while flattening the pouch at the sealing interface area against the peripheral attachment member with two parts of the inner sealant of the pouch pressed to each other;
  applying sealing energy at the sealing interface to provide an intimate seal between the peripheral attachment member and the outer sealant of the pouch, and
  releasing energy before the seal initiation temperature of the inner sealant has been achieved.

26. The method according to claim 25, wherein the pouch comprises a multilayer pouch member with the inner sealant and outer sealant as different layers; and the peripheral attachment member is at least one fitment comprising a bore and a base end, wherein the base end is securely sealed at a sealing interface area onto the outer sealant of the pouch wherein the bore demarcates a portion of the pouch that is puncturable to gain access thereinto.

27. The method according to claim 26, wherein the sealing interface area of the pouch comprises at least two circumferentially distributed sealing rings with an innermost ring situated between the base end and the pouch at the immediate vicinity of the puncturable pouch portion.

28. The method of claim 1, wherein the outer sealant covers only selected portions of the pouch.

* * * * *